United States Patent [19]
Lambert et al.

[11] Patent Number: 5,331,676
[45] Date of Patent: Jul. 19, 1994

[54] CALIBRATION FIXTURE FOR INDUCTION FURNACE

[75] Inventors: David V. Lambert, St. Matthews, S.C.; Mark P. Goldenfield, Irwin, Pa.

[73] Assignee: Westinghouse Electric Corp., Pittsburgh, Pa.

[21] Appl. No.: 162,246

[22] Filed: Dec. 6, 1993

[51] Int. Cl.$^5$ .............................................. G21C 19/00
[52] U.S. Cl. ................................ 376/260; 376/416; 373/145; 373/149
[58] Field of Search ................ 376/260, 416, 417; 976/DIG. 282, DIG. 283; 373/140, 145, 149; 374/163, 141, 209

[56] References Cited

U.S. PATENT DOCUMENTS

| | | | |
|---|---|---|---|
| 2,655,550 | 10/1953 | Zvanut | 13/24 |
| 3,270,177 | 8/1966 | Prediger et al. | 219/10.77 |
| 4,098,122 | 7/1978 | Landman et al. | 73/341 |
| 4,100,020 | 7/1978 | Andrews | 176/68 |
| 4,176,554 | 12/1979 | Kazmierowicz | 73/341 |
| 4,233,086 | 11/1980 | Vesterlund | 176/82 |
| 4,242,907 | 1/1981 | Kazmierowicz | 73/341 |
| 4,377,347 | 3/1983 | Hanmyo et al. | 374/139 |
| 4,411,861 | 10/1983 | Steinberg | 376/417 |
| 4,609,524 | 9/1986 | Ferrari | 376/417 |
| 4,613,479 | 9/1986 | Foster | 376/416 |
| 4,659,545 | 4/1987 | Ferrari | 376/416 |
| 4,675,153 | 6/1987 | Boyle et al. | 376/416 |
| 4,894,203 | 1/1990 | Adamson | 376/416 |
| 5,026,516 | 6/1991 | Taylor | 376/416 |
| 5,073,336 | 12/1991 | Taylor | 376/416 |
| 5,137,683 | 8/1992 | Hertz et al. | 376/416 |
| 5,227,129 | 7/1993 | Bryan et al. | 376/416 |

Primary Examiner—Donald P. Walsh
Assistant Examiner—Frederick H. Voss
Attorney, Agent, or Firm—Joseph C. Spadacene

[57] ABSTRACT

Nuclear fuel rod tubes of zirconium alloy are heat treated in an induction furnace to produce a protective oxide coating two to fifteen microns in thickness. The furnace is only slightly larger than the tubes and receives the endmost eight inches of the tube. The furnace is controllable in zones along the tube. To calibrate the furnace to produce the desired temperature profile, typically a flat profile at a temperature between 650° and 750° C.±1.5° C., a temperature calibration probe is provided with spaced thermocouples for sensing the temperature developed in the probe at each of the zones when heated. The probe is made of inconel 600 stainless or the like, and is dimensioned and shaped to correspond closely to the dimensions of the fuel rod tubes, including having a closed chamfered end. At the opposite end the probe protrudes from the furnace, where the thermocouple leads are terminated. The leads pass through a potting compound in the probe, such as magnesium oxide. Whereas the probe conductive structures are substantially identical to the tube, the probe responds to the electromagnetic field in the induction furnace substantially the same as does the end of the tube, permitting calibration of the induction furnace zones for a desired temperature profile, e.g., flat along the length of the tube, notwithstanding differences in induced currents that would otherwise occur due to the end of the tube or the adjacent tube material.

20 Claims, 2 Drawing Sheets

CALIBRATION FIXTURE FOR INDUCTION FURNACE

BACKGROUND OF THE INVENTION

1. Field of the Invention

The invention relates to the field of temperature measurement and control, in particular in an induction furnace for heating the end of a zirconium alloy nuclear fuel rod in the presence of an oxidizing gas, to form a protective zirconium oxide layer in an area of the fuel rod at which a fuel assembly structure tends to fret captured debris against the fuel rod. According to the invention, a probe that is configured to correspond to a fuel rod is provided with an array of spaced thermocouples for monitoring the temperature contour obtained in the induction furnace, enabling precise measurement and control of the temperature profile that occurs when a fuel rod is treated in the induction furnace under the same conditions.

2. Prior Art

In a nuclear power plant, coolant is heated in a vessel disposed along a primary coolant circuit, by nuclear fuel in the form of vertically elongated fuel rods carried in fuel assemblies. Each fuel rod comprises a stack of enriched uranium pellets in a hollow tube typically made of a zirconium alloy such as Zircalloy. The zirconium alloy presents a low nuclear cross section to neutrons that carry on the fission reaction leading to heating of the fuel. Zirconium is a highly active metal that, like aluminum, seems passive because a stable and cohesive thin zirconium oxide ($ZrO_2$) film forms on the surface in the presence of oxygen, e.g., when exposed to air or water. Formation of the oxide layer is accelerated with heating.

Zirconium is advantageous for its subatomic properties, but is not the most durable of metals. It is possible to treat zirconium fuel rod tubes prior to their use in a reactor, to add a protective cladding layer that is more durable, thicker and/or more chemically resistant than the basic tube material. Such a cladding can comprise a plated-on alloy or a distinct metal. Heating of the fuel rod tube may be involved in the process. Typically the entire tube is treated; however, it is also possible to treat only particular areas that are considered vulnerable to corrosion or the like, for example the inside of the tube. Particular claddings are chosen for corrosion resistance, especially resistance to corrosion from reaction of the zirconium with iodine and other elements released during fission of the nuclear fuel. Examples of protective treatment of the inside or outside of fuel rod tubes are disclosed, for example, in the following patents:

| | |
|---|---|
| 4,100,020 | Andrews |
| 4,233,086 | Vesterlund |
| 4,411,861 | Steinberg |
| 4,609,524 | Ferrari |
| 4,613,479 | Foster |
| 4,659,545 | Ferrari |
| 4,675,153 | Boyle et al. |
| 4,894,203 | Adamson |
| 5,026,516 | Taylor |
| 5,073,336 | Taylor |
| 5,137,683 | Hertz et al. |

In pressurized water and boiling water reactors, the fuel rods are grouped in fuel assembly structures that have vertically spaced grids for holding the fuel rods in a parallel array, whereby a number of the fuel rods can be handled as a fuel assembly unit. The liquid coolant is heated in a vessel by fission in the fuel rods, causing a vigorous and turbulent upward flow of coolant over the fuel rods due to convection. The fuel assembly grids are openwork panels disposed perpendicular to the elongation of the fuel rods, with spring structures that bear against the fuel rods to hold them in place. However, in the turbulent flow of the reactor coolant, loose metallic debris may be stopped by the grids, especially at the endmost grid facing the direction of flow. This captured debris vibrates against the fuel rods, leading to fretting damage to the zirconium alloy tube in the area of the endmost grid. A breach of the fuel rod tube can lead to release of fuel into the coolant, which is undesirable due to the resulting circulation of radioactive material with the coolant.

Fretting damage to the fuel rods has been found to occur primarily during the first cycle of their irradiation. Fissile heating of the fuel rods in the water coolant of the reactor during use thickens the zirconium oxide layer on the outer surfaces of the fuel rods and thereafter protects the fuel rods from fretting damage. Operational temperatures and pressures in a pressurized water reactor, for example, may be on the order of 300° to 400° C. and 150 bar. As described in commonly owned U.S. patent application Ser. No. 08/025,361, filed Mar. 2, 1993, it is possible to pretreat the fuel rod tubes to form a protective zirconium oxide layer prior to installation of the fuel rods. The protective layer is formed along the endmost four to eight inches (10 to 20 cm) of the fuel rod and reduces or eliminates fuel rod failure during initial use. This end portion of the fuel rod is the approximate length that protrudes from the lowermost grid of the fuel assembly, in the direction facing the coolant flow, i.e., the area in which the lowermost grid is likely to capture debris that will fret against the fuel rod.

The protective zirconium oxide layer can be formed by heating the fuel rod tube in the presence of oxygen. The thickness of the resulting $ZrO_2$ layer is a function of the time of heat treatment, the temperature, and the oxygen concentration in the treating atmosphere, typically air. It is desirable to form a uniform coating that completely encompasses the end of the tube, and has a depth of two to fifteen microns. Formation of a protective oxide by heating in this manner is of course much easier than application of an alloy cladding, for example requiring a plasma arc or other process, such as in U.S. Pat. No. 5,227,129 - Bryan et al.

There are a variety of means by which a fuel rod tube can be heated, for example using convection, laser irradiation, application of a flame, etc. An advantageous method is heating via electrical induction. The end of the fuel rod tube is placed in an electrical induction furnace having coils coupled to an AC power source, for inducing a current in the metallic zirconium material. Induced eddy currents dissipate electrical power by resistance heating. This form of heating is advantageous in that the power can be concentrated at the area to be treated (at least subject to conduction of the heat to the remainder of the fuel rod tube).

Preferably, the induction furnace is only barely larger than the fuel rod or rods being treated. In this manner, the electromagnetic field intensity can be maximized by minimizing the gap between the coils (or the ferromagnetic material coupling the field to the fuel rod) in the magnetic circuit. To achieve uniform application of electromagnetic energy, a series of adjacent or spaced coil pairs can be disposed on opposite sides of the fuel rod tube, each of the coils in a pair being energized at opposite polarity and each coil pair encompassing a limited axial length of the fuel rod. These individual coil pairs can be controlled separately, for applying the precise power level needed to achieve uniform heating of the fuel rod tube.

It is advantageous to apply the minimum power necessary to obtain the required thickness of $ZrO_2$ over all the end of the fuel rod tube to be treated. A uniform coating of $ZrO_2$ that is of sufficient thickness over all the area of treatment requires precise temperature control. To achieve the uniform heating needed over the length of the fuel rod end, some means is needed to measure the induced heat from the respective coils, and to adjust or control the power level applied to the coils as necessary. It is not entirely adequate simply to apply equal power levels to each of the coil pairs, because the effects of the induction heating may be uneven even if the field strengths are equal, due to the variations in the eddy currents induced in the fuel rods occurring due to differences in geometry along the fuel rods. For example, the induced currents may vary between the center of the treated length of the fuel rod and the extreme end of the fuel rod, or between the center and the area at which the treated portion meets the proximal portion of the fuel rod, due to end effects and due to the adjacent conductive metal, respectively. The present invention concerns a method and apparatus for sensing the temperature effects of electromagnetic induction in a fuel rod by providing a temperature probe structured to simulate the conductive and/or resistive aspects of the fuel rod tube, and has an array of thermocouples disposed to measure the temperatures at specific spaced points. In this manner a temperature profile can be measured and used to adjust the electromagnetic field strengths of the coil pairs, for obtaining a desired temperature profile when the probe is replaced by an actual fuel rod to be treated.

Temperature probes for measuring the heat in a furnace are known generally. In a typical application, the probe is moved to different areas of the furnace in order to develop a temperature profile from a series of successive measurements. It is also possible to use an array of temperature sensors on a probe, for example as shown by U.S. Pat. Nos. 4,176,554 or 4,242,907, both to Kazmierowicz, or 4,098,122- Landman et al. For such uses, the spaced temperature sensing elements of the probe are intended to measure the ambient temperature at different points in the furnace or kiln. It is assumed that the ambient temperature as so measured is the temperature to which the workpieces will be heated when at the corresponding location. The furnace or kiln is then adjusted to obtain a desired temperature profile.

This technique cannot be used effectively if the presence or movement of the workpiece being heated in the furnace has an effect on the temperature to which the workpiece is heated. In a tunnel furnace, for example, cool workpieces entering the furnace reduce the ambient temperature there, other things being equal. Similarly, where a tunnel furnace has workpieces moving from a zone at one temperature into a zone at another temperature, it will take a certain time for the workpieces to reach the temperature of the new zone, assuming that the workpieces remain long enough to reach the ambient temperature at all. The reason for providing a probe having spaced temperature sensors is to obtain a measurement of the differences in temperature from point to point in the furnace, for example due to the workpieces, so that such effects can be addressed.

Temperature probes as disclosed in Kazmierowicz or Landman et al. are not suitable for measuring the temperature profile of an electromagnetic induction furnace, for adjustment of the field generating means as needed to develop the required temperature profile in workpieces when inserted to be heated. The electrical induction form of heating apparatus is particularly affected by the presence of the workpiece, because for the most part the heat is generated in the workpiece rather than in the ambient air of the furnace. Although indirect temperature sensing means could be installed in the furnace to sense the workpiece temperature at different points, this is a complex and expensive solution to the problem. According to the present invention, a probe having spaced temperature sensors is configured to resemble a workpiece, in particular the end of a fuel rod tube to be heated for producing a protective oxide layer, whereby currents induced in the probe and the temperature to which the probe is heated, closely model the situation for actual fuel rod workpieces.

SUMMARY OF THE INVENTION

It is an object of the invention to provide a temperature probe for monitoring the temperature profile obtained in conductive parts heated in an electromagnetic induction furnace.

It is another object of the invention to simplify the measurement of temperature in the heat treating of nuclear fuel rod tubes by electromagnetic induction.

It is a further object of the invention to enable precise temperature control in a compact induction furnace, sized to closely complement the parts being heated.

These and other objects are accomplished by heating nuclear fuel rod tubes of zirconium alloy in an induction furnace to produce a protective oxide coating two to fifteen microns in thickness. The furnace cavity is only slightly larger than the tubes and receives the endmost eight or so inches of the tube. The furnace is controllable in zones along the tube, for example in one inch increments. To calibrate the furnace to produce the desired temperature profile, typically a flat profile at a temperature between 650° and 750° C.$\pm$1.5° C., a temperature calibration probe is provided with spaced thermocouples for sensing the temperature developed in the probe at each of the zones when heated. The probe preferably is made of Inconel 600 alloy or the like, and is dimensioned and shaped to correspond closely to the dimensions of the fuel rod tubes, including having a closed chamfered end. At the opposite end the probe protrudes from the furnace, where the thermocouple leads are terminated. The leads pass through a potting compound in the probe, such as magnesium oxide. Whereas the probe conductive structures are substantially identical to corresponding structures of the tube with respect to heating by electromagnetic induction, the probe responds to the electromagnetic field in the induction furnace substantially the same as does the end of the tube, permitting calibration of the induction furnace zones for a desired temperature profile, e.g., a flat profile along the length of the tube, notwithstanding differences in induced currents that would otherwise occur due to the end of the tube or the adjacent tube material.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
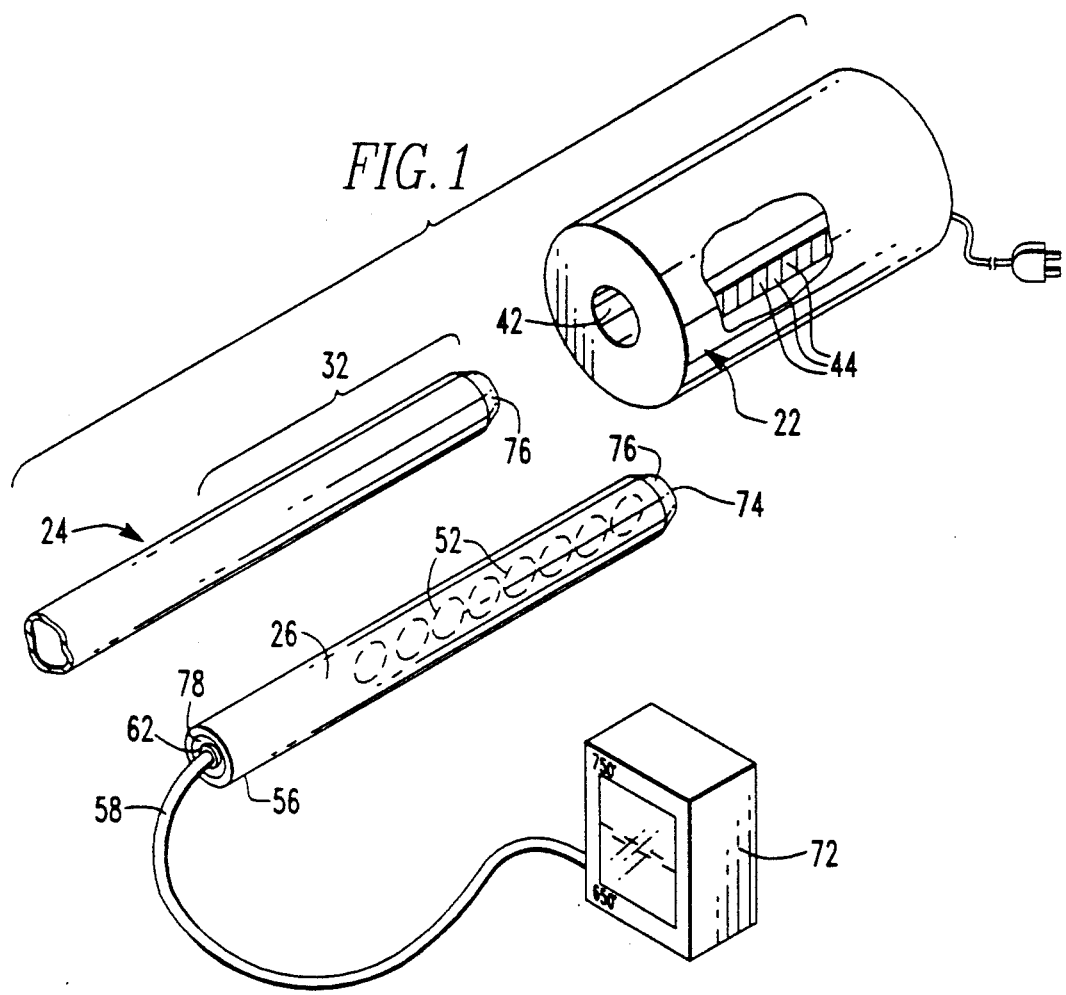
FIG. 1 is a partly cutaway view showing the induction heater for a nuclear fuel rod tube and temperature probe according to the invention.
Figure 2:
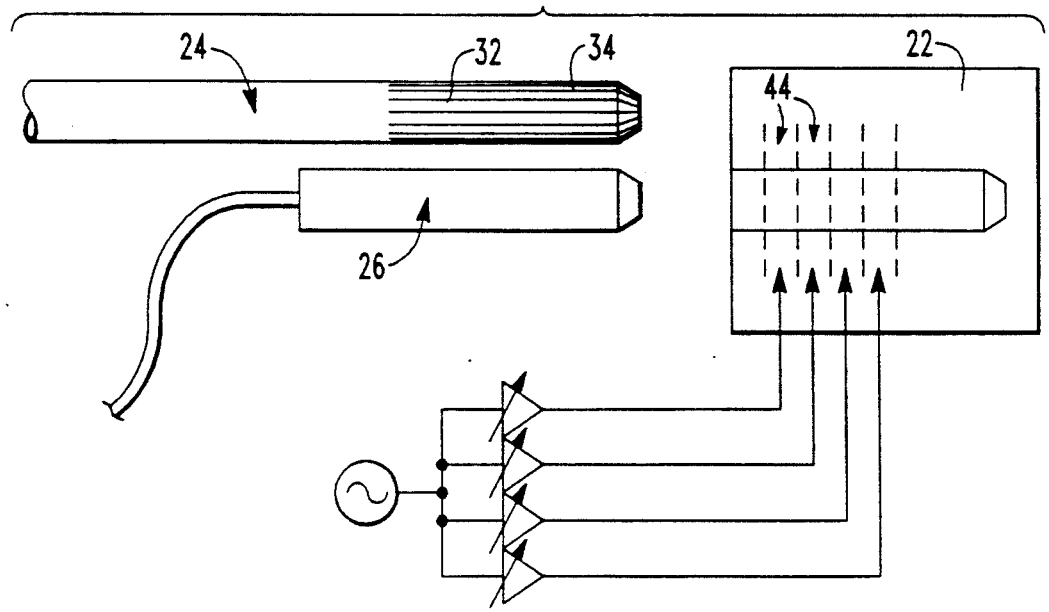
FIG. 2 is a schematic illustration showing the probe and robe, and means for adjusting the induction heater power level in zones.

FIGS. 1 and 2 show an induction furnace 22 for heat treating portions of workpieces, in particular the ends of nuclear fuel rod tubes 24 (one such tube being shown), and a temperature probe 26 that is structured to respond to induction heating in substantially the same way that the tubes 24 respond. The induction heater 22 is adjusted or set up to obtain a flat temperature profile over the portion of the workpiece 24 to be heated, using the probe 26 to determine indirectly the temperature profile that will be obtained when treating the tubes 24. The probe 26 is then removed from the induction furnace 22 and a fuel rod tube 24 is inserted. Whereas the fuel rod tube 24 and the probe 26 have essentially identical temperature responses to the induction heating electromagnetic field, the fuel rod tube 24 is heated to the temperature profile required, which was set up using the temperature probe 26.

Figure 3:
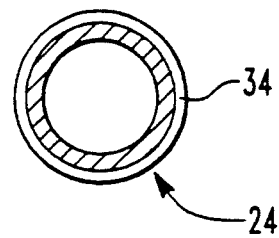
FIG. 3 is a lateral section view along the axis of a treated fuel rod robe.

The fuel rod tubes 24 comprise a zirconium alloy, and are heat treated along an end portion 32 prior to irradiation in a nuclear reactor, to develop a protective cladding 34 of zirconium oxide from two to fifteen microns in thickness, as shown in FIGS. 2 and 3. Preferably, the temperature profile achieved in the induction furnace 22 is flat along the treated length 32, the temperature profile being adjusted or controlled to obtain an even temperature between about 650° and 750° C. along the length 32 of the tube 24. This even profile results in the most efficient heat treatment because the resulting coating 34 of oxide is of even thickness in an amount sufficient to protect the fuel rods 24 from fretting damage, and no time or electrical energy are expended unnecessarily in forming an area in the coating that is unnecessarily thick. Conversely, there is no portion of the end of the tube 24 that is not adequately protected by a too-thin coating. Preferably, the fuel rod tubes 24 are protected in this manner over an endmost four to eight inches, or 10 to 20 cm, namely the length of the fuel rods 24 that extends from the lowermost grid in a fuel assembly (not shown) holding a number of such fuel rods.

The induction furnace 22 includes conventional means for generating an alternating electromagnetic field in a cavity 42, and preferably is adjustable to set the required field strength in zones 44 that are adjacent one another axially along the probe 26 and/or the fuel rod 24. The cavity 42 is dimensioned to closely receive at least one tube 24, and also may receive more than one. However, in an arrangement for treating more than one tube 24 at a time, it is preferable to use more than one probe 26 (or to use the probe in one position when there is a tube in each other position), so that the field strength to which the probe 26 is subjected is the same as for a tube 24 in the same position, and the same heating effects are achieved.

The temperature probe 26 carries a number of temperature sensors 52 and has conductive tubular structure 54 dimensioned to correspond closely to the nuclear fuel rod tubes 24 at the end 32 to be treated. Accordingly, the probe 26 is at least as long as the cavity 42, and preferably protrudes from the cavity 42 by a distance sufficient that the induced currents from the induction field are affected by the portion of the probe 26 protruding from the cavity 42 in the same way that the currents in a fuel rod tube 24 are affected by the portion that protrudes, even though the fuel rod tube 24 is much longer than the probe 26. The fuel rod tube 24 may be 3 m in length and 0.374" (about 1 cm) in diameter. For a heat treatment cavity, for example, of eight inches (20 cm) in length, the probe 26 is preferably at least fourteen inches (36 cm) in length, thus protruding from the cavity 42 by six inches or 16 cm. In any event, the probe 26 is structured as to diameter, length, wall thickness and shape to respond substantially the same as the fuel rod tube 24 to inducement of current by the electromagnetic field of the induction heater 22.

It is possible to make the conductive portion of the probe 26 from zirconium, i.e., the identical same material as used for the tube. However, with heating of the probe over successive measurement cycles, an oxidation layer builds up on a zirconium probe in the same manner that an oxidation layer builds up on the tubes when heated. In addition, numerous cycles of heating can affect the crystalline structure of zirconium alloy, which also would alter the response of the probe over time, and make the response of the probe different than that of a fresh fuel rod tube. Therefore, the conductive portion of the probe 26 according to the invention is an alloy material that is not affected by a buildup of oxide over time, preferably Inconel 600 alloy. The entire conductive tube of the probe can be Inconel 600, or Inconel 600 can be provided at least on the outer surface of a probe that is otherwise made of Zircalloy, to resist oxidation. Inconel 600 alloy is resistant to structural changes due to heating. The alloy is compatible with Zircalloy, and resists galvanic corrosion and oxidation. However, a probe of Inconel 600 alloy has electromagnetic induction and heat transfer properties that are very similar to those of Zircalloy. Accordingly, the alloy probe closely models the performance of an untreated tube, and its response remains stable over a number of heating cycles.

The induction furnace 22 can be structured as an eight inch (20 cm) long cylinder or the like, subdivided into zones 44 in which the electromagnetic field strength can be set up or adjusted separately. The furnace 22 can comprise ferromagnetic structures, and preferably is made substantially from Inconel 600 alloy, for the same properties that are advantageous for the probe. The furnace has a bore that closely fits either the tube 24 or the probe 26, having only sufficient clearance to enable the fuel rod tube 24 or the probe 26 to be moved in or out, allowing for temperature expansion. The bore can be 0.375 inches in diameter, slidably accommodating either the probe 26 or the tube 24. At the inner end of the bore 42, the bore can complement the shape of the distal end of the fuel rod tube 24 or the probe 26, both of which have the same shape and dimensions. By making the bore in the ferromagnetic material of the furnace 22 nearly the same size as the probe 26 and tube 24, any air gap and associated dissipation of the electromagnetic field strength is minimized.

A plurality of temperature sensors 52 are disposed at spaced points along the probe 26, preferably corresponding with the heating zones 44. The zones can be placed, for example, at one inch (2.5 cm) centers, with the temperature sensors 52 centered in their respective zones. The temperature sensors 52 are mounted in heat transfer relationship with the conductive casing structure 54 of the probe, for example being attached to the inner wall of the tubular metallic casing of the probe 26, thereby sensing the probe temperature at a discrete location along the probe. Each of the probe temperature sensors 52 is operable to produce a signal representing the temperature of the probe 26 at the respective zone 44.

The sensors 52 are wired to the proximal end 56 of the probe 26 by leads 58 passing internally through the probe 26. A connector 62 or similar means can be provided for coupling the temperature sensors 52 to means 72 for decoding the signal, such as a meter or readout. Alternatively, the leads 58 can extend from the proximal end 56 of the probe 26 for suitable connection to meters, amplifiers, digitizers, feedback controls or other similar means. After monitoring the temperatures obtained at each zone 44 on the probe 26 with induction heating, the electromagnetic field in the cavity 42 can be adjusted or controlled for each zone 44 to obtain predetermined operating conditions.

The induction furnace 22 produces an alternating electromagnetic field that induces a current in the conductive structure 54 of the probe 26 or tube 24. The currents produced are eddy currents, and their energy is released substantially in resistive heating of the conductive structure 54. Individual adjustment of the zones 44 is preferable because the localized induced currents are produced as a function of the coupling of the field to the conductive structure 54. Adjacent the distal end 74 of the probe or tube, which is closed, the conductive material 54 extends transversely across the axis of the probe or tube, whereas at intermediate zones the conductive structure 54 is simply a section of hollow cylinder. In order to obtain the same flux density in the more extensive conductive material at the end 74, as is obtained in the less extensive conductive material at intermediate points (thereby to obtain a comparable temperature rise), the field intensity is adjusted accordingly.

Figure 4:
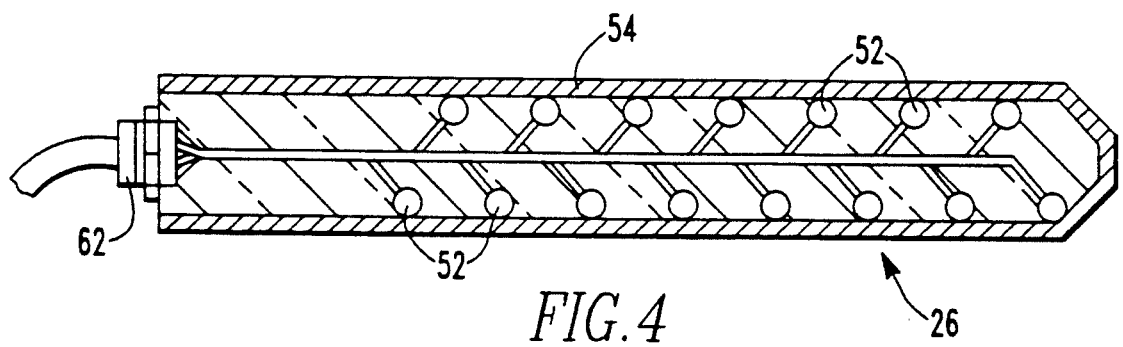
FIG. 4 is a longitudinal section view showing the structure of the probe.

The temperature sensors 52 can be special type K thermocouples, disposed in the probe 26 at regularly spaced points and arranged to sense the temperature of the thermally and electrically conductive metal portion 54 of the probe 26. These points can be linearly spaced along the probe 26 as in FIG. 2, or arranged at different angles around the probe 26 as suggested by FIG. 1. Also, as shown in FIG. 4, the temperature sensors 52 can be placed on opposite sides of the tubular casing 54 in an alternating manner. Any of these mountings is effective to measure the probe temperature in the respective zone.

FIG. 4 shows an internal structure of the probe 26, the same reference numbers being used throughout the drawings to identify the same elements. In a preferred embodiment, eight special type K thermocouples are placed in the probe 26 at one inch intervals, beginning at the insert or distal end 74 of the probe so as to also monitor the temperature at or adjacent the chamfer 76 or similar shape at the end 74 of the fuel rod tube 24. Wire leads 58 from each thermocouple pass along the body of the probe 26 through a potting material 78 such as magnesium oxide, to the proximal end 56 of the probe 26, protruding from the furnace 22. The proximal end 56 can be sealed, and provided with connector means 62 for coupling the thermocouples to the meters, digitizers or similar means for converting the thermocouple signals to temperature information. The temperature information as thus obtained can be used initially when setting up the furnace 22 by individual adjustment of the power output in each respective zone 44 of the induction furnace 22, to obtain a flat temperature profile. After initial set up, the probe 26 can be used as necessary to monitor the profile being maintained, allowing regular recalibration, calibration following maintenance procedures, etc. The probe 26 is also useful in the event of a change of operating conditions, for example if the furnace 22 is to be set up to process fuel rod tubes for a shorter time and higher temperature or a longer time at lower temperature. These adjustments can be made via manual controls, as shown schematically in FIG. 2, or the probe 26 can be coupled to a control means (not shown) for automatically determining the power levels needed for a predetermined (e.g., flat) temperature profile, and setting the furnace 22 to maintain such levels.

Accordingly, the method of heat treating a workpiece 24 such as a nuclear fuel rod tube, or other workpiece having an at least partly conductive structure, involves providing a temperature probe 26 with a conductive portion 54 substantially corresponding in response to electromagnetic induction heating to the conductive structure of the workpiece 24, and a plurality of temperature sensors 52, spaced on the probe 26. The probe 26 is inserted into the induction furnace 22, and heated by electromagnetic induction of current in the conductive portion 54 of the probe 26. Temperatures of the probe 26 are detected at different points by the temperature sensors 52, for verifying or setting the required temperature profile. After such verifying or setting of the temperatures as generated in the probe 26 by induction and detected in the probe by the temperature sensors 52, the probe 26 is removed. The workpiece 24 is inserted into the induction furnace 22 in place of the probe 26, and heat treated. By first adjusting at least one of a power level and a duration or duty cycle of the electromagnetic induction as a function of the temperatures of the probe 26 as detected by the temperature sensors 52, using a probe 26 that responds to the induction energy in a manner similar to the fuel rod tube or other workpiece 24, the workpiece is heat treated at the required temperature profile.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method for heat treating a workpiece having an at least partly conductive structure, comprising the steps of:

providing a temperature probe with a conductive portion substantially corresponding in response to induction heating to the conductive structure of the workpiece, and a plurality of temperature sensors spaced on the probe;

inserting the probe into an induction furnace, and heating the probe by electromagnetic induction of current in the conductive portion of the probe;

monitoring temperatures of the probe as detected by the temperature sensors;

removing the probe and inserting the workpiece in place of the probe, adjusting at least one of a power level and a duration of the electromagnetic induction as a function of the temperatures of the probe as detected by the temperature sensor.

2. The method according to claim 1, wherein the workpiece is elongated and said electromagnetic induction of current comprises subjecting the workpiece to zones of alternating current electromagnetic fields along a direction of elongation of the workpiece.

3. The method according to claim 1, wherein the workpiece comprises an elongated metal tube and the probe is dimensioned to correspond to the tube along an end to be inserted into the induction furnace.

4. The method according to claim 2, wherein the workpiece is an elongated nuclear fuel rod, tube comprising zirconium, and further comprising heating an end of the tube sufficiently in the induction furnace to provide an oxide layer on a surface of the tube at least two microns in thickness.

5. The method according to claim 4, wherein the tube is chamfered at said end and the temperature probe is shaped to correspond to the tube and dimensioned to protrude from the induction furnace over at least a part of a length of the tube.

6. The method according to claim 4, comprising controlling the induction furnace to maintain a temperature along the end of the tube in a range of 650° to 750° C.

7. The method according to claim 4, comprising calibrating the induction furnace to obtain an even temperature along the probe, and thus along the end of the tube.

8. A temperature calibration probe for use in an induction furnace in heat treating ends of nuclear fuel rod tubes, the fuel rod tubes having an elongated structure and the induction furnace being dimensioned to closely encompass the ends of the tubes, the probe comprising:

a conductive structure dimensioned to correspond closely in response to electromagnetic induction heating to the elongated structure of the tubes at said ends;

a plurality of temperature sensors disposed at spaced points along the probe, the temperature sensors being mounted in heat transfer relationship with the conductive structure of the probe and operable to produce a signal representing temperatures at the spaced points; and, means for coupling the temperature sensors to means for decoding the signal.

9. The temperature calibration probe according to claim 8, wherein the temperature sensors comprise special type K thermocouples disposed in the probe at regularly spaced points.

10. The temperature calibration probe according to claim 9, wherein the probe comprises a conductive tube, closed on an end to be inserted into the furnace, and further comprising leads coupling the temperature sensors to a end of the tube remote from the closed end and a potting in the tube, the leads passing through the potting.

11. The temperature calibration probe according to claim 8, wherein the probe comprises a conductive tube including an oxidation resistant outer surface.

12. The temperature calibration probe according to claim 8, wherein the probe comprises a conductive tube including Inconel 600 alloy.

13. In combination, an induction furnace for heat treating ends of nuclear fuel rod tubes and a temperature probe, comprising:

the induction furnace including means for generating an alternating electromagnetic field in a cavity, the cavity being dimensioned to closely receive at least one of the tubes, and means for adjusting the electromagnetic field in the cavity;

the temperature probe including a conductive tube structure dimensioned to correspond closely to the nuclear fuel rod tubes at said ends and having a material responding to the electromagnetic field substantially similarly to a response of the tubes, whereby the conductive structure and the tubes responds substantially the same to inducement of current by the electromagnetic field;

a plurality of temperature sensors disposed at spaced points along the probe, the temperature sensors being mounted in heat transfer relationship with the conductive structure of the probe and operable to produce a signal representing temperatures at the spaced points; and, means for coupling the temperature sensors to means for decoding the signal, whereby the electromagnetic field in the cavity can be adjusted to obtain predetermined operating conditions.

14. The combination according to claim 13, wherein said means for generating the alternating electromagnetic field comprises separately controllable zones along a direction of elongation of the fuel rod tubes and the probe.

15. The combination according to claim 14, wherein the nuclear fuel rod tubes comprise zirconium, and wherein the induction furnace is dimensioned to receive at least eight inches at an end of the tube, and the probe is dimensioned to protrude from the induction furnace at one end of the probe.

16. The combination according to claim 15, wherein the fuel rod tubes are chamfered at the end received in the induction furnace, and the temperature probe is chamfered to correspond to the tubes.

17. The combination according to claim 13, wherein the induction furnace is controllable in zones to maintain a temperature along the end of the tube in a range of 650° to 750° C., and the temperature sensors are positioned in each of the zones.

18. The combination according to claim 13, wherein the temperature sensors comprise special type K thermocouples disposed in the probe at regularly spaced points.

19. The combination according to claim 13, wherein the probe comprises a conductive tube, closed on an end to be inserted into the furnace, and further comprising leads coupling the temperature sensors to a end of the tube remote from the closed end and a potting in the tube, the leads passing through the potting.

20. The combination according to claim 13, wherein the nuclear fuel rod tubes comprise zirconium, and wherein the probe comprises Inconel 600 alloy.

* * * * *